United States Patent
Marshall

[15] 3,678,844
[45] July 25, 1972

[54] FOOD COOKING GRILL

[72] Inventor: Edward M. Marshall, 8107 S.W. 72 Ave. Apt. 102 E, Miami, Fla. 33143

[22] Filed: July 8, 1971

[21] Appl. No.: 160,632

[52] U.S. Cl. .............................. 99/340, 99/400, 99/425, 99/446
[51] Int. Cl. ....................................... A47j 37/06
[58] Field of Search .................. 99/340, 331, 339, 346, 376, 99/400, 425, 444, 446; 126/9, 25; 219/385, 443

[56] References Cited

UNITED STATES PATENTS

| | | |
|---|---|---|
| 2,515,521 | 7/1950 | Loffredo ........................ 99/340 UX |
| 3,064,637 | 11/1962 | Thomson ........................ 99/340 X |
| 3,166,006 | 1/1965 | Lennox ........................... 99/446 |
| 3,617,693 | 11/1971 | Shimosawa ..................... 99/446 X |

Primary Examiner—Edward L. Roberts
Assistant Examiner—Arthur O. Henderson
Attorney—Lloyd J. Andres

[57] ABSTRACT

An electric grill having an enclosed casing with a foraminated grill plate in the upper end thereof with a detachable electric heating element thereunder including one or a pair of manually operable flat skillet plates for weighting food on the grill plate and cooking certain food on the top thereof. A slot at the rear of the grill plate for holding each skillet plate at two predetermined clearance angles and for holding the skillet plate in a substantially upright idle position, including a drip pan in the casing slidably positioned under the grill plate a predetermined distance from the heating element.

6 Claims, 9 Drawing Figures

PATENTED JUL 25 1972 3,678,844

INVENTOR.
EDWARD M. MARSHALL
BY
Lloyd Hinson

PATENTED JUL 25 1972

INVENTOR.
EDWARD M. MARSHALL
BY
Lloyd J. Andres

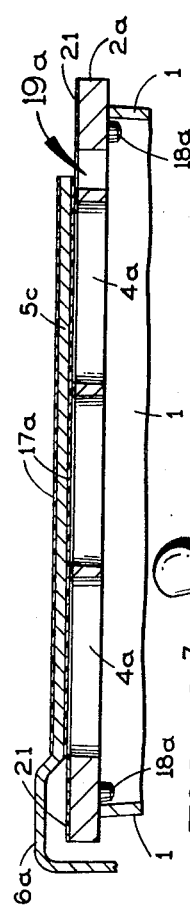
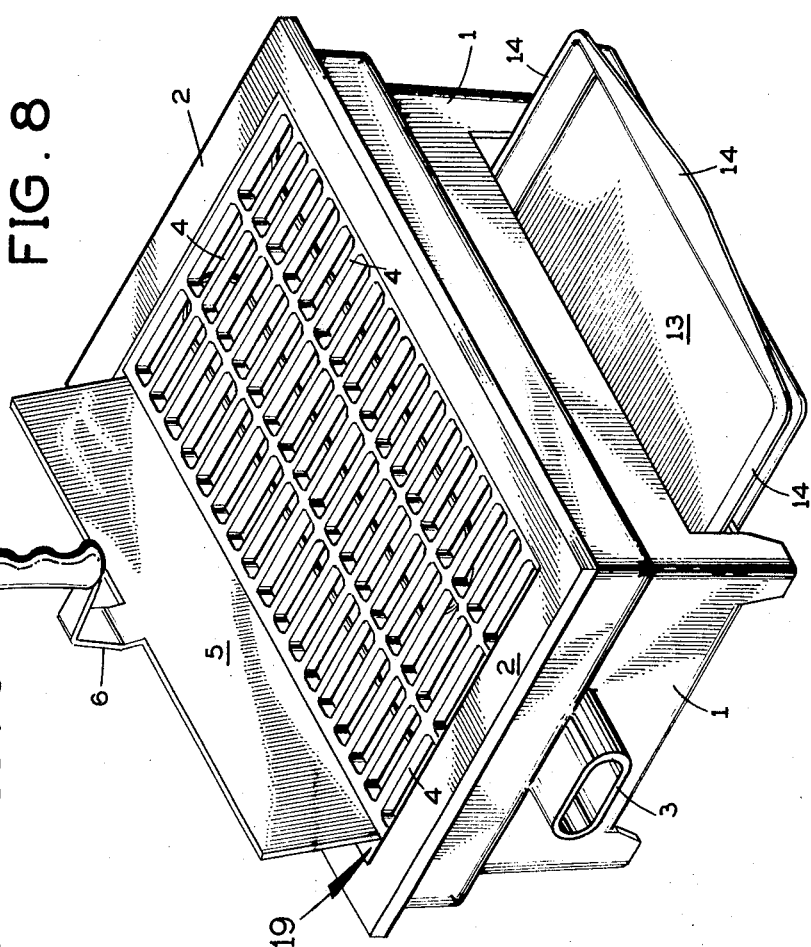
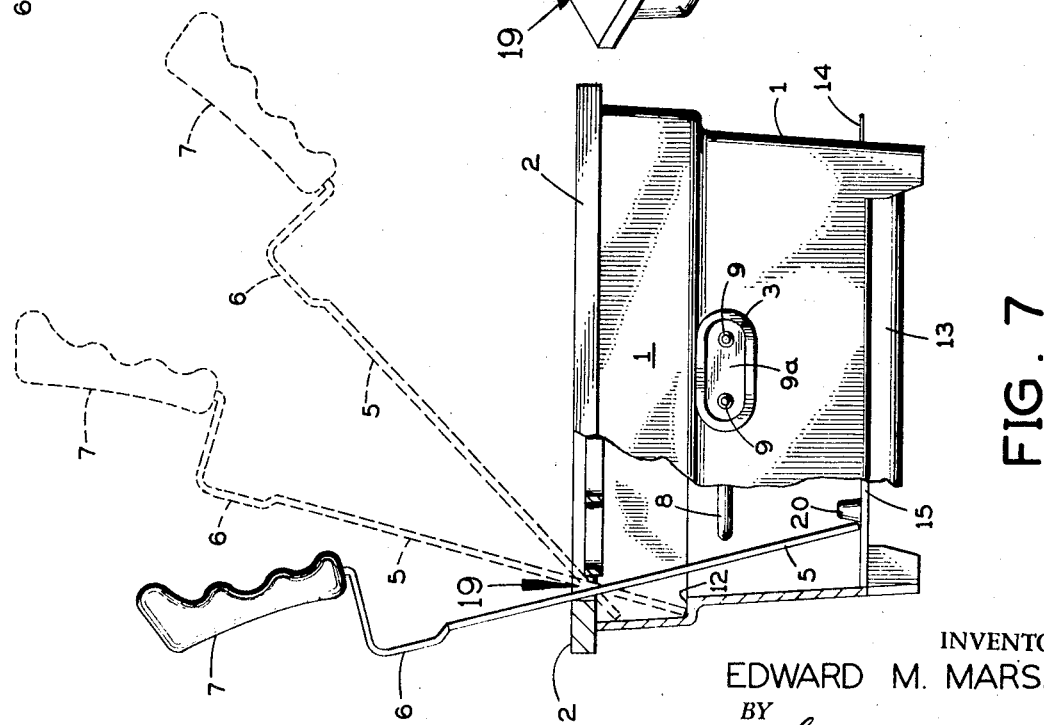
FIG. 8
FIG. 9
FIG. 7
INVENTOR.
EDWARD M. MARSHALL
BY
Lloyd Sanders

FOOD COOKING GRILL

This invention relates in general to cooking devices and more particularly to a portable electric cooking grill for rapidly and uniformly cooking food thereon under the weight of a skillet plate, which device includes a slot for manually receiving the skillet plate in a choice of angular positions for food removal and temperature maintenance and also for upright positioning in an idle position.

Reference is had to applicant's pending application, Ser. No. 77,548, filed Oct. 2, 1970 now U.S. Pat. No. 3,623,422.

A principal object of the invention is the provision of an improved portable grill incorporating several features not included in the aforesaid pending application, such as the use of a single casing member formed to properly receive and position the grill plate, and one or two skillet plates including means within a rear slot along the grill plates for holding each skillet plate at each of two selected predetermined angles with respect to the grill plate for the removal of food thereunder and maintaining a predetermined temperature in each plate from the heated upward draft from the casing, including the manual raising of the plates for descent to idle position in the slot.

A further object of the invention is the provision of a detachable serpentine shaped heating element assembly under said grill plate and supported by marginal ledges in opposite ends of the casing with the electric terminals thereof positioned in a tubular entry in one side of said casing for connection to a source of electric power.

Another object of the invention includes the provision of a frontal elongated opening in the casing for receiving a slidable drip pan supported on opposite edges on the inner sides thereof for positioning the pan directly under the grill plate a predetermined vertical distance from the heating element assembly.

A further object of the invention provides for the removal of the heating element assembly and the use of briquettes or other fuel positioned in the drip pan or similar receptacle for heating the grill and skillet plates.

These and other objects and advantages in one embodiment of the invention, are described and shown in the following specification and drawings, in which:

FIG. 7 is a left hand end view with a portion broken away and an illustration of partial operation.

FIG. 8 is a perspective view of the grill shown in FIG. 1 in idle position.

FIG. 9 is an alternate fragmentary cross sectional view showing a modified grill and skillet plate.

Figure 1:
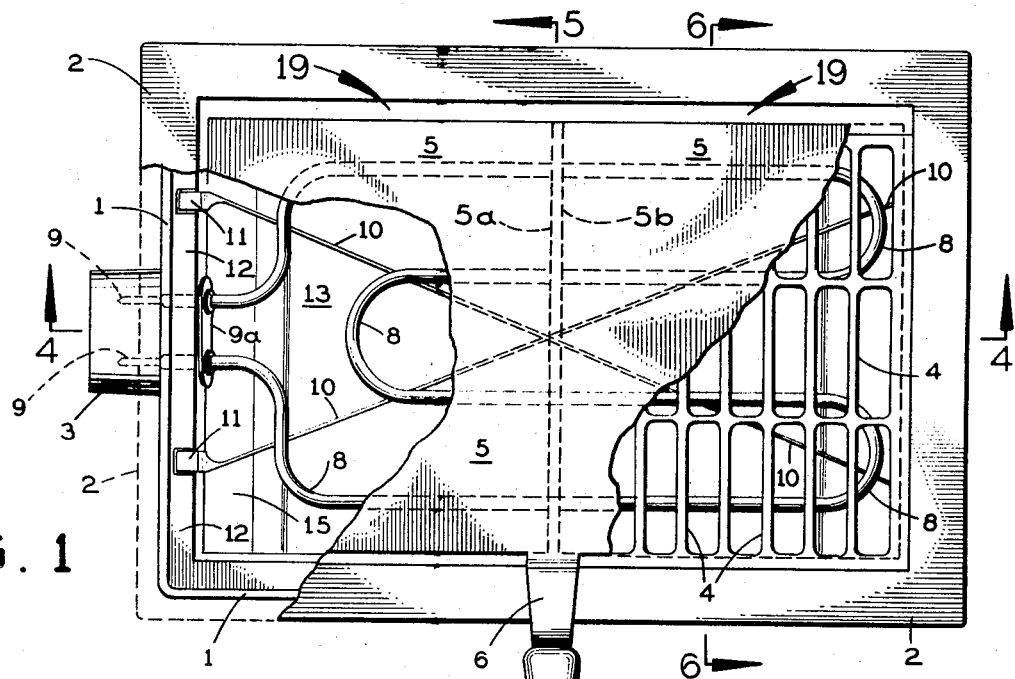
FIG. 1 is a top plan view of the cooking grill with portions thereof broken away.
Figure 2:
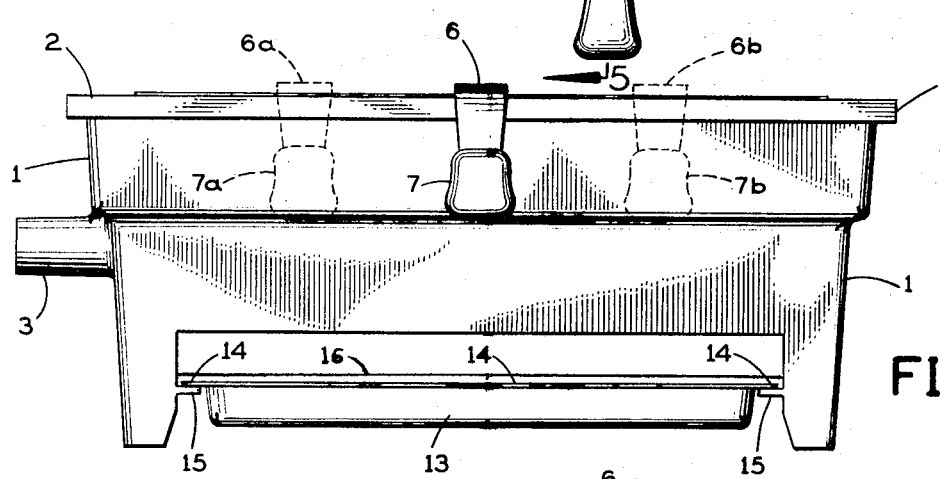
FIG. 2 is a front elevation of the grill shown in FIG. 1.
Figure 3:
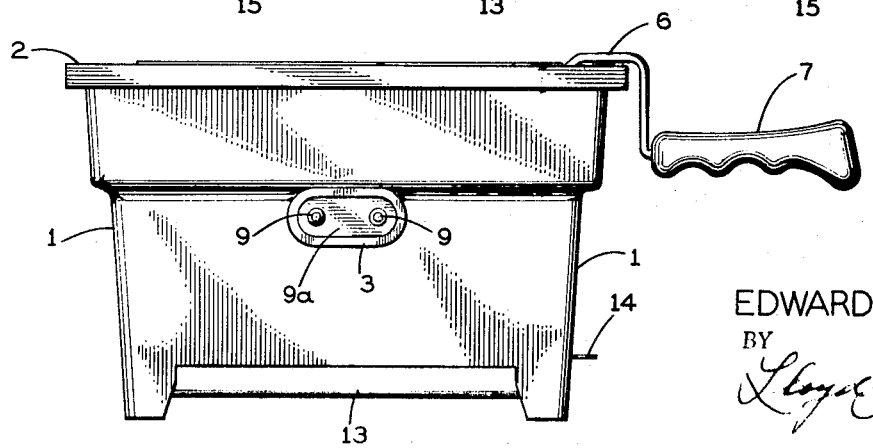
FIG. 3 is a left side elevation of the grill shown in FIG. 2.

Referring to FIGS. 1, 2, and 3, a generally rectangular hollow metal casing 1 is provided with a gravity positioned frame 2 resting on the upper edge thereof having a planar upper surface. An integral tubular electric socket entry 3 extends from one end of the casing.

A foraminated grill plate 4 is adapted to be retained by gravity in a recess in the upper portion of the frame 2, as shown. A single or double rectangular flat skillet plate 5 is loosely retained in the aforesaid recess above the grill plate and provided with a central integral bridge shaped extension 6 formed over the frame 2 and terminating in a handle 7 for manipulating the plate 5 for weighting food upon the grill and cooking food resting on the grill or on the upper side thereof. The handle is also used for tilting the plate to a stand-by or idle position, to be hereinafter described.

A removable armored electric heating element 8 is positioned under the grill 4 and terminates in a pair of electric terminals 9—9 within the entry 3 retained in a heat resistant insulation means 9a. The electric element is supported by a pair of edgewise crossed vertical interlocked strips 10 which are retained by integral brackets 11 at opposite ends thereof which bear upon a ledge 12 at opposite ends of the casing 1.

Referring to FIG. 2, an elongated opening in the front lower portion of the casing permits a tray or pan 13 having a flange 14 projecting around the edge to be supported by a pair of projecting members 15—15 extending from opposite inner ends of the casing 1 which include at the rear end of each a stop 16 for positioning the pan 13 directly under the grill 4.

Figure 4:
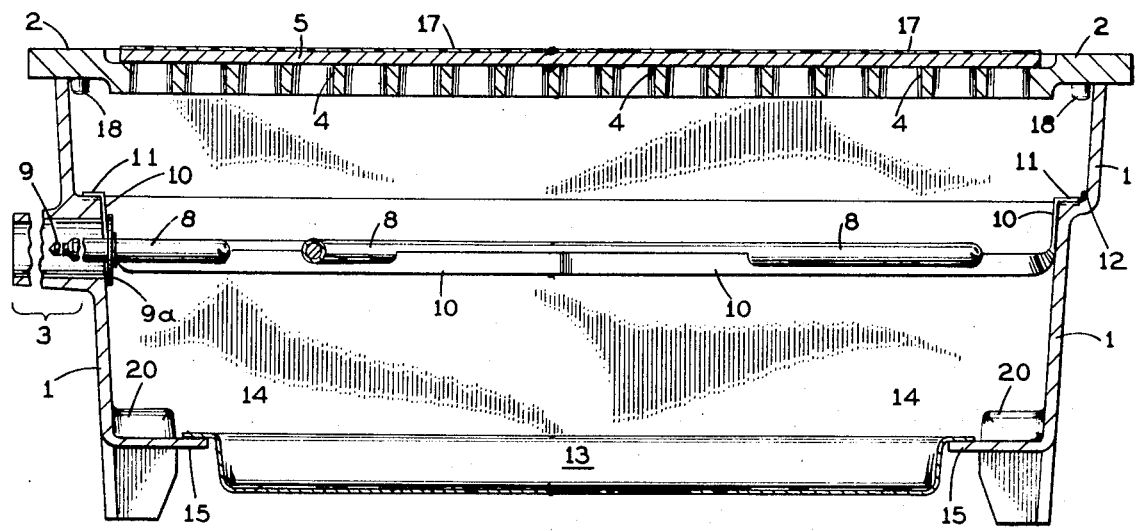
FIG. 4 is a cross sectional view taken through section line 4—4, FIG. 1.

Referring to FIG. 4, the skillet or plate 5 normally rests on the grill 4 when in use and is coated with a non-stick plastic, such as Teflon 17, on the entire upper side thereof to prevent food cooked thereon from sticking.

Figure 5:
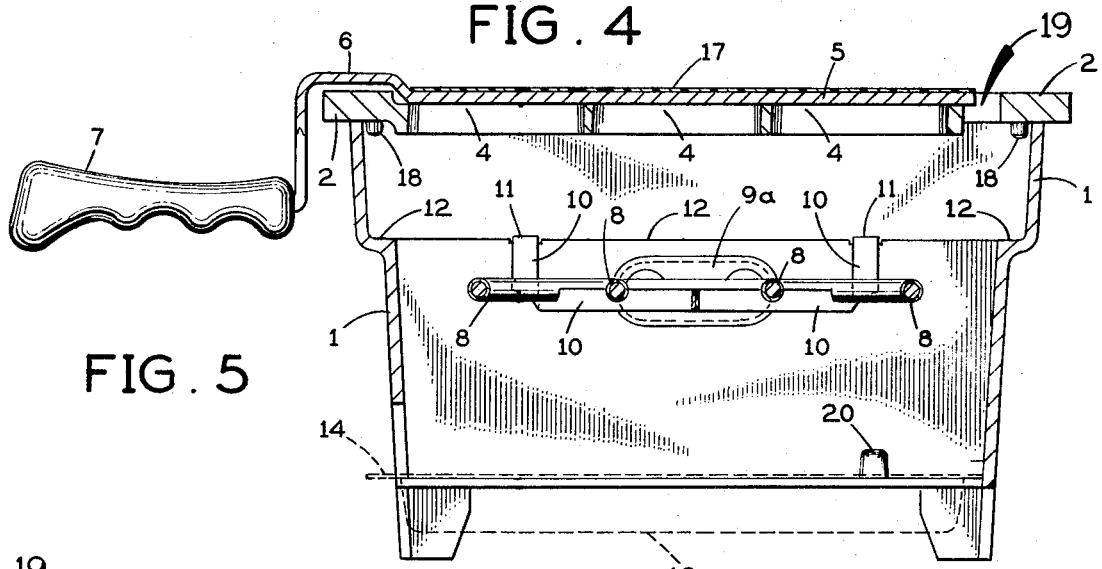
FIG. 5 is a cross sectional end elevation taken through section line 5—5, FIG. 1.
Figure 6:
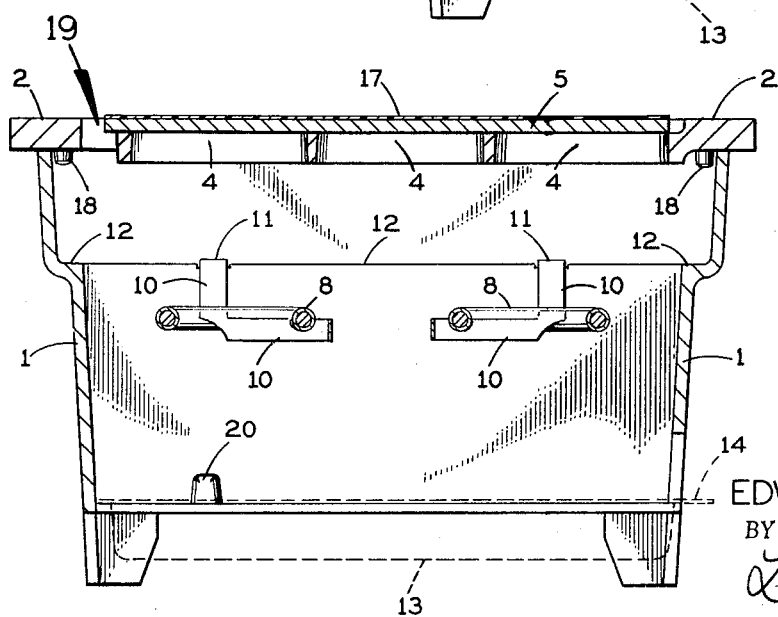
FIG. 6 is a cross sectional end elevation taken through section line 6—6, FIG. 1.

Referring to FIGS. 4, 5, and 6, four stop projections 18 extending downward from the underside of frame 2, as shown, precisely register the frame 2 and the grill plate within the top of the casing 1.

Referring to FIGS. 1, 5, and 6, it is to be noted that slot 19 is provided between the rear edge of the grill and the adjacent inner side of the frame 2, which provides for receiving and passing the cooking skillet or plate 5.

Referring to FIG. 7, when the plate 5 has served its purpose, it may be moved by handle 7 into idle position by raising approximately ninety degrees and permitting the plate to descend by gravity through slot 19 and descend to stop against projecting ledge members 15 on each side of the body and come to rest leaning rearward with the lower edge of the plate against the stop 20 at each side of the body, as shown.

It has been found in certain cases that it is advantageous to maintain a higher than room temperature in the plate 5 while the heater is energized by permitting the plate to rest against the lower inner corner of the frame 2 and the upper outer corner of the grill, as shown. This position will maintain a predetermined holding temperature in the plate for subsequent use. A lower temperature may be maintained in the plate by permitting the plate to rest on the shoulder 12 of the casing and the outer upper lateral corner of the grill, as shown.

The perspective view of FIG. 8 represents the grill at rest with the pressure plate or skillet in idle or rest position and the drip pan partially withdrawn.

In operation and under the assumption that an energized electric power cord terminating in a connected plug, which may include an adjustable thermostat, is inserted in the entry 3 connecting terminals 9 to energize the heater assembly 8, the direct radiation therefrom will heat the grill plate 4 rapidly, which heating is accelerated by the up-draft caused by the enclosure of the casing 1. It is obvious that one or two skillet plates 5 will receive maximum heat when resting by gravity upon the grill plate. When the temperature of the grill plate has reached a predetermined maximum, then either or both of the skillet plates is raised to a selected angular position by the handle 7 and the food, such as hamburger, steak, or the like, is placed directly on the heated grill plate and the skillet plate lowered into gravity contact with the food. Thus, the exposure of the food to heat from both bottom and top completes the cooking cycle in a relatively short period of time. The skillet plate is then raised to a predetermined angular position and the food removed in the usual manner. If re-use of the device is desired, the skillet plate is left in the angular position to maintain a reasonable temperature therein.

FIG. 9 shows an alternate construction wherein the frame 2a is retained by four pins 18a in the same manner as previously used in the inside corners of the frame 1. However, the top surface of the grill plate 4 is now coplanar with the top surface of the frame 2a.

FIG. 9 also shows a non-stick coating, such as Teflon 17, on the upper sides of the frame and grill plate, as well as on both sides of the skillet plate for obvious cleaning purposes.

In the event that the cooking of other foods, such as pancakes, eggs, etc., is desired they may be cooked on the top surface of the cooking plate when it is lowered over the grill plate, as shown in FIGS. 1–3, and handled in well known manner. When a cooking cycle is completed, the heating element may be deenergized and each or both of the skillet plates may be placed in idle position by raising handle 7 to a substantially upright position with the rear end thereof in the slot 19 adjacent the grill plate and permitted to descend by gravity to come to rest on the projecting ledge members 15, leaning rearward with the lower edge of each plate forward against the stop 20 at each side of the body.

It is apparent that any fat or grease drippings from the cooking will descend from the grill plate and fall into the drip pan when properly positioned.

A well known adjustable thermostat may be included in the power cord plug for insertion in entry 3 for automatically controlling the temperature of the cooking grill plate via heat conduction through the casing into the entry tube 3.

It is also apparent that the grill plate may be readily heated by detaching the heating element and burning well known briquettes or other solid fuel in the drip pan or a similar receptacle when the receptacle is positioned under the grill plate.

Certain modifications in construction are intended to come within the scope and teachings of the above specification.

Having described my invention, I claim:

1. A portable cooking grill comprising a means forming a hollow rectangular casing having an open top and bottom,
the upper edge of said casing terminating in an integral frame having a substantially planar upper surface,
a planar foraminated cooking grill plate with the margin thereof removably gravity retained in said frame parallel therewith and a predetermined distance below said surface,
said grill plate positioned in said frame providing a longitudinal open slot of predetermined width from the rear edge thereof and one inner edge of said frame,
a rectangular drip pan of predetermined depth having substantially planar flanges extending from the sides and front thereof and normally supported by opposite said side flanges under said grill plate by opposite transverse ledge projections extending inward a predetermined distance from the inner side of each end of said casing for slidable removal through a clearance opening in the front side of said casing,
a planar skillet plate removably gravity retained on said grill plate within said frame and having a handle means secured to a central extension thereof projecting from said front side of said casing,
said skillet plate adapted to be raised from the grill plate and the rear margin thereof inserted in said slot with the upper marginal side thereof bearing against the under corner of said frame and the lower marginal side bearing against the upper rear corner of said grill plate for holding said skillet plate at a predetermined angle with respect to said grill plate,
a source of heat under said grill plate for heating the latter and the skillet plate whereby food placed on said grill plate will be rapidly cooked and the drippings therefrom descend into said drip pan when said skillet plate is manually moved to gravitate thereupon.

2. The construction recited in claim 1 including a stop projection positioned on the upper side of each of said transverse ledge projections whereby said skillet plate may be manually raised to gravitate through said slot with the lower edge thereof in contact with each said opposite ledge projection and tilted against said stop for holding said skillet plate in its idle position.

3. The construction recited in claim 1 wherein the top surface skillet plate may be used for cooking certain foods when positioned on said grill plate and heated by conduction and transmission of heat by said grill plate.

4. A portable cooking grill comprising a means forming a hollow rectangular casing having an open top and bottom,
the upper edge of said casing terminating in a gravity retained top frame having a substantially planar upper surface,
said casing having an upper outward transverse offset of uniform width forming a ledge around the inner periphery of said casing a predetermined distance from the said surface of the said frame,
a planar foraminated cooking grill plate with the margin thereof removably gravity retained in said frame with the upper surface thereof substantially coplanar and symmetrically positioned with respect to said upper surface of said frame,
said grill plate positioned in said frame for providing a longitudinal open slot of predetermined width from the rear edge thereof and one inner edge of said frame,
a receptacle of predetermined depth having substantially planar flanges extending from the sides and front thereof and normally support by opposite said side flanges under said grill plate by opposite transverse ledge projections extending inward a predetermined distance from the inner side of each end of said casing for slidable removal through a clearance opening in the front side of said casing,
a planar skillet plate removably gravity retained on said grill plate within said frame and having a handle means secured to a central extension thereof projecting from said front side of said casing,
said casing having a tubular entry for receiving an electric power plug receptacle integral with one end of said casing,
an electric heater assembly retained under said grill plate by said ledge and having the electric terminals thereof projecting into said entry whereby said electric power cord terminating in a plug receptacle will engage said terminals when moved into said entry and energize said heating element for heating said grill plate and said skillet plate and whereby food placed on said grill plate and said skillet plate placed in gravity contact therewith will be rapidly cooked and removed by first manually raising said skillet plate and the rear edge thereof permitted to descend through said slot and rest upon said ledge for holding said skillet plate at a second predetermined angle with respect to said grill plate.

5. The construction recited in claim 4 wherein the single skillet plate is replaced by two adjacent plates with corresponding like said handles whereby the cooking of food may be selectively conducted on the grill plate or upon the top surface of the skillet plate.

6. The construction recited in claim 4 including a metal receptacle slidably supported on said ledge projections at opposite ends thereof and normally positioned under said grill plate for retaining combustible solid fuel for heating said grill plate and said skillet plate when said electric heater assembly is removed.

* * * * *